(12) United States Patent
Minakuchi

(10) Patent No.: US 9,137,404 B2
(45) Date of Patent: Sep. 15, 2015

(54) IMAGE FORMING APPARATUS AND IMAGE FORMING METHOD

(71) Applicant: KYOCERA Document Solutions Inc., Osaka (JP)

(72) Inventor: Koji Minakuchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 55 days.

(21) Appl. No.: 14/063,564

(22) Filed: Oct. 25, 2013

(65) Prior Publication Data

US 2014/0118763 A1 May 1, 2014

(30) Foreign Application Priority Data

Oct. 31, 2012 (JP) ................. 2012-241311

(51) Int. Cl.
*H04N 1/00* (2006.01)
*G03G 15/00* (2006.01)

(52) U.S. Cl.
CPC ....... *H04N 1/00763* (2013.01); *G03G 15/5095* (2013.01); *G03G 15/6594* (2013.01); *H04N 1/00708* (2013.01)

(58) Field of Classification Search
None
See application file for complete search history.

(56) References Cited

U.S. PATENT DOCUMENTS

| 6,831,751 | B1 | 12/2004 | Mori |
| 7,808,663 | B2 | 10/2010 | Teranishi |
| 7,999,968 | B2 | 8/2011 | Teranishi |
| 8,218,184 | B2 | 7/2012 | Imaoka |
| 2005/0052673 | A1 | 3/2005 | Mori |
| 2008/0186523 | A1 | 8/2008 | Mori |
| 2010/0165371 | A1 | 7/2010 | Mori |
| 2011/0279830 | A1 | 11/2011 | Mori |

FOREIGN PATENT DOCUMENTS

| JP | H04-149462 A | 5/1992 |
| JP | H04-149463 A | 5/1992 |
| JP | H09-102863 A | 4/1997 |
| JP | 2001-189853 A | 7/2001 |
| JP | 2001-223854 A | 8/2001 |

(Continued)

OTHER PUBLICATIONS

JP-2004023409-translation, Sato, Jan. 2004, Japan.*

(Continued)

*Primary Examiner* — Fan Zhang
(74) *Attorney, Agent, or Firm* — Knobbe, Martens, Olson & Bear LLP

(57) ABSTRACT

An image forming apparatus includes an image forming section, a document size detecting section, a recording medium size selecting section, and a control section. When one of a pair of image data sets to be placed on both sides of a common recording medium by image formation of the image forming section is greater in length of the document size detected by the document size detecting section than the other, the recording medium size selecting section selects, as a size of the recording medium for the pair of image data sets, a size greater in length than the other image data set. When the other image data set is to be formed as an image on a page preceding the one image data set, the control section allows the image forming section to form the image on an area from a leading edge to a middle of the recording medium.

5 Claims, 11 Drawing Sheets

(56) References Cited

FOREIGN PATENT DOCUMENTS

| | | |
|---|---|---|
| JP | 2007-065141 A | 3/2007 |
| JP | 2009-284213 A | 12/2009 |
| JP | 2012-195947 A | 10/2012 |
| JP | 2014-088048 A | 5/2014 |

OTHER PUBLICATIONS

JP-2004023409-abstract, Sato, Jan. 2004, Japan.*
Notice of Rejection mailed by Japan Patent Office on Nov. 4, 2014 in the corresponding Japanese Patent Application No. 2012-241311—5 pages.

* cited by examiner

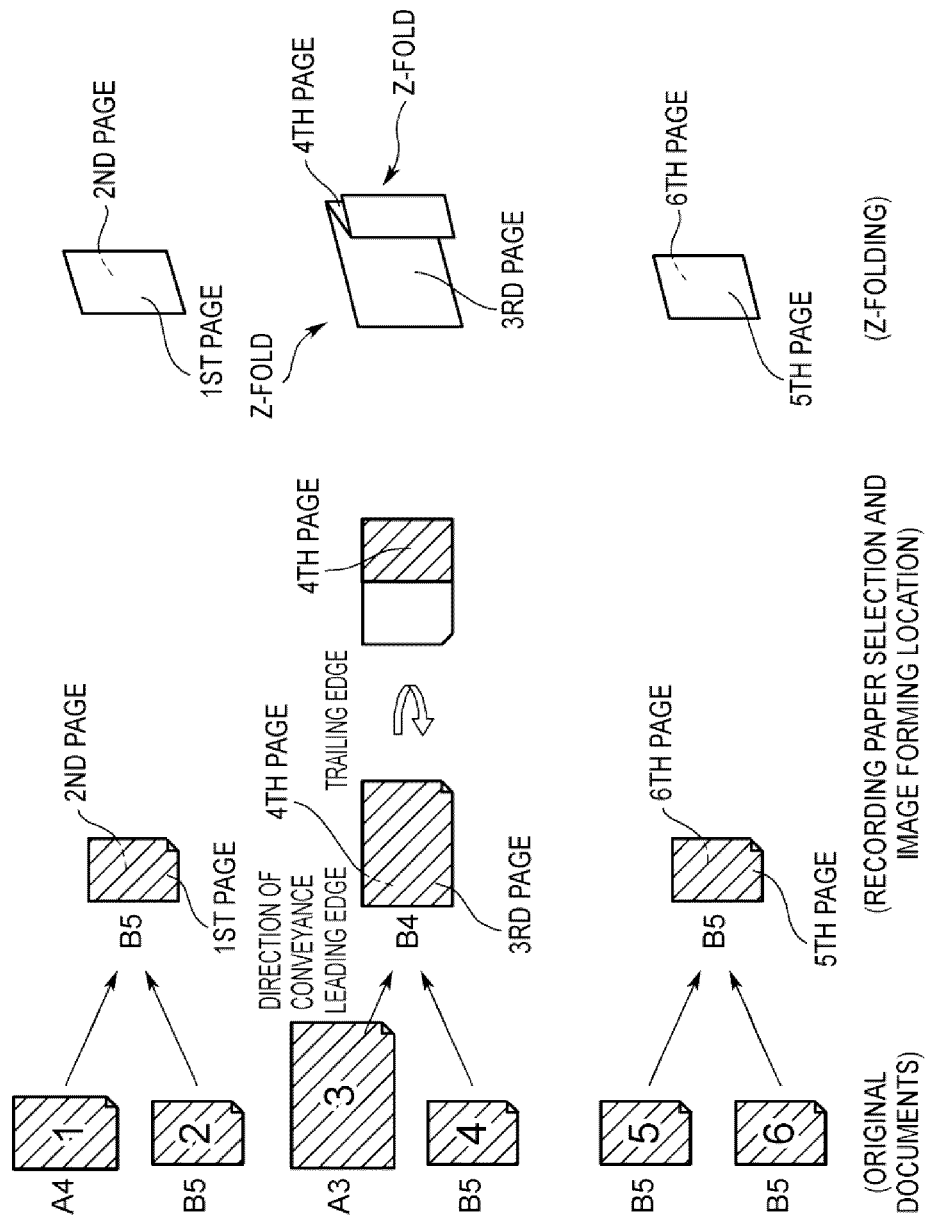

IMAGE FORMING APPARATUS AND IMAGE FORMING METHOD

INCORPORATION BY REFERENCE

This application claims priority to Japanese Patent Application No. 2012-241311 filed on Oct. 31, 2012, the entire contents of which are incorporated by reference herein.

BACKGROUND

The present disclosure relates to mixed document size double-sided printing in which double-sided printing is performed for mixed original documents of different sizes.

Conventionally, in double-sided printing for single-sided original documents in an image forming apparatus, image data sets read from the original documents in a scanner section are used to print images on both sides of recording paper sheets. Each of these images is formed on a recording paper sheet of the same size as the size of the corresponding original document detected by the image forming apparatus. However, in mixed document size double-sided printing, original documents to be read have different sizes. Therefore, if images are tried to be formed on both sides of a single recording paper sheet based on a pair of image data sets generated from a pair of original documents of different sizes, there may be cases where the size of recording paper sheet to be used is different between one side and the other side. As a solution to these cases, a proposed conventional image forming apparatus changes double-sided printing to single-sided printing to use two separate recording paper sheets of different sizes instead of both sides of a single recording paper sheet on which a pair of images were supposed to be printed by double-sided printing.

SUMMARY

A technique improved over the aforementioned technique is proposed as one aspect of the present disclosure.

An image forming apparatus according to an aspect of the present disclosure includes a document reading section, a document size detecting section, an image forming section, a recording medium size selecting section, a conveyance section, and a control section.

The document reading section is configured to read one side of each of mixed original documents of different document sizes constituting a plurality of pages to generate respective image data sets of the original documents.

The document size detecting section is configured to detect respective sizes of the original documents to be read by the document reading section.

The image forming section is configured to form images on both sides of recording media from the image data sets of the original documents generated by the document reading section.

The recording medium size selecting section is configured, when, out of the image data sets of the original documents generated by the document reading section and constituting the plurality of pages, one of a pair of image data sets to be placed on one and the other sides of a common recording medium by image formation of the image forming section is greater in length of the document size detected by the document size detecting section than the other image data set, the length being a dimension in a direction of conveyance of the recording medium, to select, as a size of the recording medium for use in forming images from the pair of image data sets, a size having a greater length in the direction of conveyance of the recording medium than the other image data set.

The conveyance section is configured to convey the recording medium of the size selected by the recording medium size selecting section to the image forming section.

The control section is configured to allow the image forming section to form, on the recording media conveyed by the conveyance section, images from the image data sets of the original documents and configured, when the other of the pair of the image data sets to be placed on one and the other sides of the common recording medium is to be formed as an image on a page preceding the one of the pair of image data sets, to allow the image forming section to form the image from the other image data set on an area from a leading edge to a middle of the recording medium in the direction of conveyance of the recording medium by the conveyance section.

An image forming method according to another aspect of the present disclosure includes a document reading step, a document size detecting step, a recording medium size selecting step, a conveyance step, and an image forming step.

The document reading step is the step of reading one side of each of mixed original documents of different document sizes constituting a plurality of pages to generate respective image data sets of the original documents.

The document size detecting step is the step of detecting respective sizes of the original documents to be read in the document reading step.

The recording medium size selecting step is the step of, when, out of the image data sets of the original documents generated in the document reading step and constituting the plurality of pages, one of a pair of image data sets to be placed on one and the other sides of a common recording medium by image formation is greater in length of the document size detected in the document size detecting step than the other image data set, the length being a dimension in a direction of conveyance of the recording medium, selecting, as a size of the recording medium for use in forming images from the pair of image data sets, a size having a greater length in the direction of conveyance of the recording medium than the other image data set.

The conveyance step is the step of conveying the recording medium of the size selected in the recording medium size selecting step.

The image forming step is the step of forming, on the recording media having sizes selected in the recording medium size selecting step and conveyed in the conveyance step, images from the image data sets of the original documents and, when the other of the pair of image data sets to be placed on one and the other sides of the common recording medium is to be formed as an image on a page preceding the one of the pair of image data sets, forming the image from the other image data set on an area from a leading edge to a middle of the recording medium in the direction of conveyance of the recording medium.

BRIEF DESCRIPTION OF THE DRAWINGS

FIG. 11 is a diagram showing six original documents as original documents to be read and respective other examples of recording paper sheet selection and image forming location, Z-folding, and stapling.

DETAILED DESCRIPTION

Hereinafter, a description will be given of an image forming apparatus and an image forming method according to an embodiment as one aspect of the present disclosure with reference to the drawings.

Figure 1:
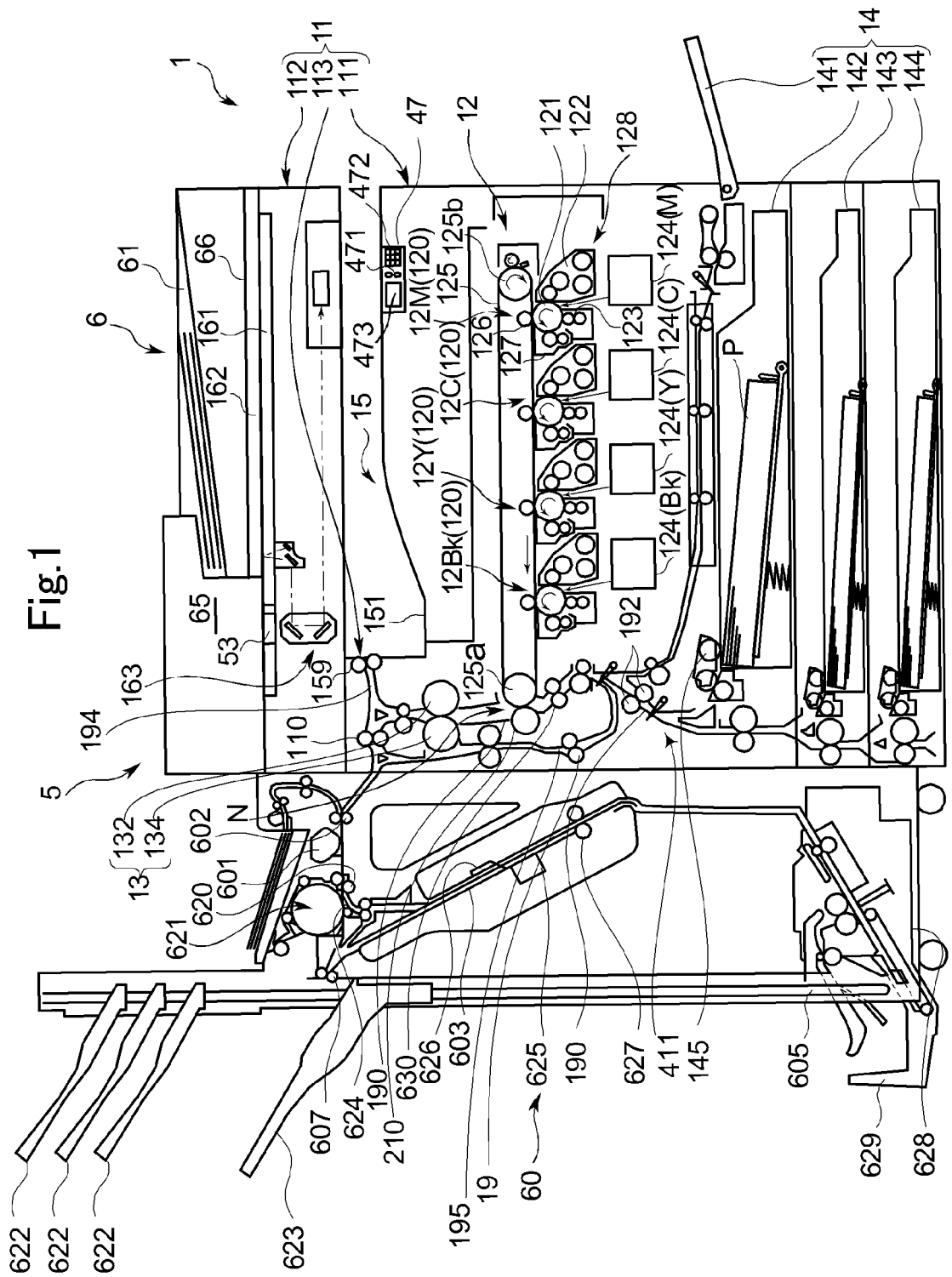
FIG. 1 schematically shows the internal structure of an image forming apparatus according to one embodiment of the present disclosure.

FIG. 1 schematically shows the internal structure of an image forming apparatus 1 according to one embodiment of the present disclosure. The image forming apparatus 1 is a multifunction peripheral having multiple functions including, for example, a copy function, a print function, a scan function, and a facsimile function. The image forming apparatus 1 is made up so that an apparatus body 11 includes an operating section 47, an image forming section 12, a fixing section 13, a paper feed section 14, a paper output section 15, a document feed section 6, a document reading section 5, and so on.

The apparatus body 11 includes a lower body 111, an upper body 112 opposed to and above the lower body 111, and a connecting portion 113 provided between the upper body 112 and the lower body 111.

The operating section 47 receives entry of various operation commands from an operator. The operating section 47 includes a start key 471, a ten-key pad 472, and a display 473. The display 473 is formed of, for example, an LCD (liquid crystal display) and its panel portion has a touch panel function.

The document reading section 5 includes an original glass plate 161 which is fitted to the top of an opening in the upper body 112 and on which an original document is to be placed, an openable/closable original cover 162 for holding the original document placed on the original glass plate 161, and a reader 163 for reading an image of the original document placed on the original glass plate 161. The reader 163 optically reads the image of the original document using an image sensor, such as a CCD (charge coupled device), to generate image data.

The document feed section 6 includes a document placement table 61 on which original documents are to be placed, a document ejection portion 66 to which original documents after image reading are to be ejected, and a document conveyance mechanism 65. The document conveyance mechanism 65 includes an unshown paper feed roller, an unshown conveyance roller, and an unshown paper reversing mechanism. The document conveyance mechanism 65 feeds original documents placed on the document placement table 61 sheet by sheet by the drive of the paper feed roller, conveys the document to a position facing a document read slit 53 by the drive of the conveyance roller to allow the reader 163 to read the document through the document read slit 53, and then ejects it to the document ejection portion 66. Furthermore, the document conveyance mechanism 65 allows the paper reversing mechanism to reverse the side of the original document and conveys the document to the position facing the document read slit 53 again to allow the reader 163 to read not only one side of the document but also the other side thereof through the document read slit 53.

The document feed section 6 is pivotally mounted to the upper body 112 so that its front side can move upward. When the front side of the document feed section 6 is moved up to make the top surface of the original glass plate 161 as a document table open, the operator can place, on the top surface of the original glass plate, an original document to be read, for example, an open book with facing pages.

The lower body 111 is internally provided with the image forming section 12, the fixing section 13, and the paper feed section 14. The upper body 112 is provided with the document reading section 5. The paper feed section 14 includes a plurality of, for example, three paper feed cassettes 142, 143, 144 insertable into and removable from the apparatus body 11. Each of the paper feed cassettes 142, 143, 144 contains a paper sheet stack formed of stacked recording paper sheets P (a type of recording medium). For example, the paper feed cassette 142 contains A4-size recording paper sheets, the paper feed cassette 143 contains A3-size recording paper sheets, and the paper feed cassette 144 contains B5-size recording paper sheets.

The image forming section 12 performs an image forming operation of forming a toner image on a recording paper sheet fed from the paper feed section 14. The image forming section 12 includes a magenta image forming unit 12M, a cyan image forming unit 12C, an yellow image forming unit 12Y, and a black image forming unit 12Bk which are sequentially arranged from upstream to downstream in the running direction of an intermediate transfer belt 125 (hereinafter, each image forming unit is also called an "image forming unit 120" when referred to without distinction). The magenta image forming unit 12M uses magenta toner. The cyan image forming unit 12C uses cyan toner. The yellow image forming unit 12Y uses yellow toner. The black image forming unit 12Bk uses black toner. The image forming section 12 also includes the intermediate transfer belt 125 mounted between a plurality of rollers including a drive roller (roller opposed to a secondary transfer roller described below) 125a to be able to endlessly run in a direction of sub scanning for image formation, and a secondary transfer roller 210 which engages against a portion of the intermediate transfer belt 125 wound around the drive roller 125a on the outer peripheral side of the intermediate transfer belt 125.

Each image forming unit 120 includes a developing unit 128 and a primary transfer roller 126 disposed at a position opposed to the developing unit 128 with the intermediate transfer belt 125 interposed therebetween. The developing unit 128 includes a photosensitive drum 121, a developing device 122 operable to supply toner to the photosensitive drum 121, a toner cartridge (not shown) for holding toner, a charging device 123, an exposure device 124, and a drum cleaning device 127.

The intermediate transfer belt 125 is disposed above the photosensitive drums 121. The outer peripheral surface of the intermediate transfer belt 125 is set to an image carrying surface to which a toner image is to be transferred. The intermediate transfer belt 125 is driven by the drive roller 125a while engaging against the peripheral surfaces of the photosensitive drums 121. The intermediate transfer belt 125 endlessly runs between the drive roller 125a and a driven roller 125b while synchronizing with the rotation of each photosensitive drum 121.

Each primary transfer roller 126 is provided at a position opposed to the associated photosensitive drum 121 with the intermediate transfer belt 125 interposed therebetween. The primary transfer roller 126 transfers the toner image formed on the outer peripheral surface of the associated photosensitive drum 121 to the surface of the intermediate transfer belt 125.

A control section 100 (FIG. 2) of the image forming apparatus 1 controls the drive of the primary transfer roller 126 and image forming unit 120 for each color to perform the transfer of a magenta toner image formed by the magenta image forming unit 12M to the surface of the intermediate transfer belt 125, then the transfer of a cyan toner image formed by the cyan image forming unit 12C to the same position of the intermediate transfer belt 125, then the transfer of an yellow toner image formed by the yellow image forming unit 12Y to the same position of the intermediate transfer belt 125, and finally the transfer of a black toner image formed by the black image forming unit 12Bk to superimpose these different colored toner images on each other. Thus, a multicolor toner image is formed on the surface of the intermediate transfer belt 125 (intermediate transfer or primary transfer).

A transfer bias is applied to the secondary transfer roller 210 by an unshown transfer bias application mechanism. The secondary transfer roller 210 transfers the multicolor toner image formed on the surface of the intermediate transfer belt 125, at a nip N between the secondary transfer roller 210 and the drive roller 125a with the intermediate transfer belt 125 in between, to a recording paper sheet conveyed from the paper feed section 14 along a conveyance path 190.

To the left of the image forming section 12 in FIG. 1, a vertically extending conveyance path 190 is formed. The conveyance path 190 is provided at appropriate positions with pairs of conveyance rollers 192. The pairs of conveyance rollers 192 convey a recording paper sheet fed out of the paper feed section 14 toward the nip N and the fixing section 13.

The paper feed section 14 includes a manual feed tray 141 openably and closably provided at a right side wall of the apparatus body 11 in FIG. 1, and the paper feed cassettes 142, 143, 144. Pick-up rollers 145 provided above the paper feed cassettes 142, 143, 144 can feed respective uppermost recording paper sheets of the paper sheet stacks contained in the paper feed cassettes 142, 143, 144 to the conveyance path 190.

A conveyance section 411 is made up of, for example, the pick-up rollers 145, the pairs of conveyance rollers 192, a pair of registration rollers 630, a pair of output rollers 159, and drive sources of these rollers.

The fixing section 13 performs a fixing treatment by applying heat from a heat roller 132 to the toner image on the recording paper sheet transferred in the image forming section 12 while the recording paper sheet is passing through a fixing nip between the heat roller 132 and a pressure roller 134. The recording paper sheet on which a color image has been fixed by the completion of the fixing treatment passes through a paper output path 194 extended from the top of the fixing section 13 and is ejected to a paper output tray 151 or a post-processing unit 60.

The paper output section 15 includes the paper output tray 151. The recording paper sheet having a toner image formed thereon in the image forming section 12 is ejected to the paper output tray 151 after it is subjected to a fixing treatment in the fixing section 13.

In the case of forming images on both sides of the recording paper sheet P in the image forming section 12, under the control of the control section 100, the recording paper sheet P having an image already formed on one side in the image forming section 12 is nipped between the pair of output rollers 159 provided toward the paper output tray 151, then moved back and conveyed by the pair of output rollers 159 to a reverse conveyance path 195 branched off from the paper output path 194 and provided as a portion of the conveyance path 190, and conveyed again upstream of the nip N and the fixing section 13 in a direction of conveyance of the recording paper sheet P by pairs of conveyance rollers 19 provided at different locations in the reverse conveyance path 195. Thus, an image is formed on the other side of the recording paper sheet P by the image forming section 12.

The image forming apparatus 1 further includes the post-processing unit 60. The post-processing unit 60 includes a punching section 601 operable to punch the paper sheet carried therein from a pair of output rollers 110 of the apparatus body 11 as a type of post-processing, a conveyance roller 602 operable to convey the paper sheet carried in the post-processing unit 60, a paper sheet cradle 603 operable as a paper sheet stack to temporarily store conveyed paper sheets, a conveyance roller 620 operable to convey the paper sheet with an image formed thereon and the original document each conveyed by the conveyance roller 602, a pair of output rollers 607 operable to discharge the paper sheet conveyed from the paper sheet cradle 603 to a main paper output tray 623, an escape drum 621 operable to escape the paper sheet being conveyed next when post-processing will not keep up with the incoming next paper sheet, a mailbox 622 formed of a plurality of bins and the main paper output tray 623 all of which can be moved up and down by an unshown lift and to which the paper sheet conveyed from the paper sheet cradle 603 and the paper sheet directly conveyed from the conveyance roller 602 can be discharged, and a conveyance branching guide 624 operable to switch the direction of conveyance of the paper sheet coming from the conveyance roller 620 between a way to the paper sheet cradle 603 and a way to the pair of output rollers 607 which will discharge the paper sheet to the mailbox 622 or the main paper output tray 623.

The post-processing unit 60 further includes a stapling device 625 operable to staple the paper sheet conveyed to the paper sheet cradle 603 as a type of post-processing, a stop member 626 capable of receiving the lower end of the paper sheet conveyed to the paper sheet cradle 603 and holding the paper sheet, a conveyance roller 627 operable to convey the paper sheet downward from the paper sheet cradle 603, a booklet forming section 628 operable to fold a set of paper sheets conveyed from the conveyance roller 627 at their middle lines to bring them together in booklet form, and a paper output tray 629 to which the paper sheets brought together in booklet form by the booklet forming section 628 are discharged.

The paper sheet cradle 603 includes a drive part (not shown) operable to move the stop member 626 in a direction of discharge of the paper sheet. The drive part actuates in response to a control signal from the control section 100, so that the paper sheet held on the stop member 626 is conveyed to the pair of output rollers 607 and discharged to the main paper output tray 623 by the pair of output rollers 607.

The lift 605 is configured to raise and lower the position of the main paper output tray 623 in response to a control signal from the control section 100 so that the upper surface of the stack of paper sheets already discharged on the main paper output tray 623 is located at a reference position suitable for the discharge of the next stack of paper sheets from the pair of output rollers 607.

Figure 2:
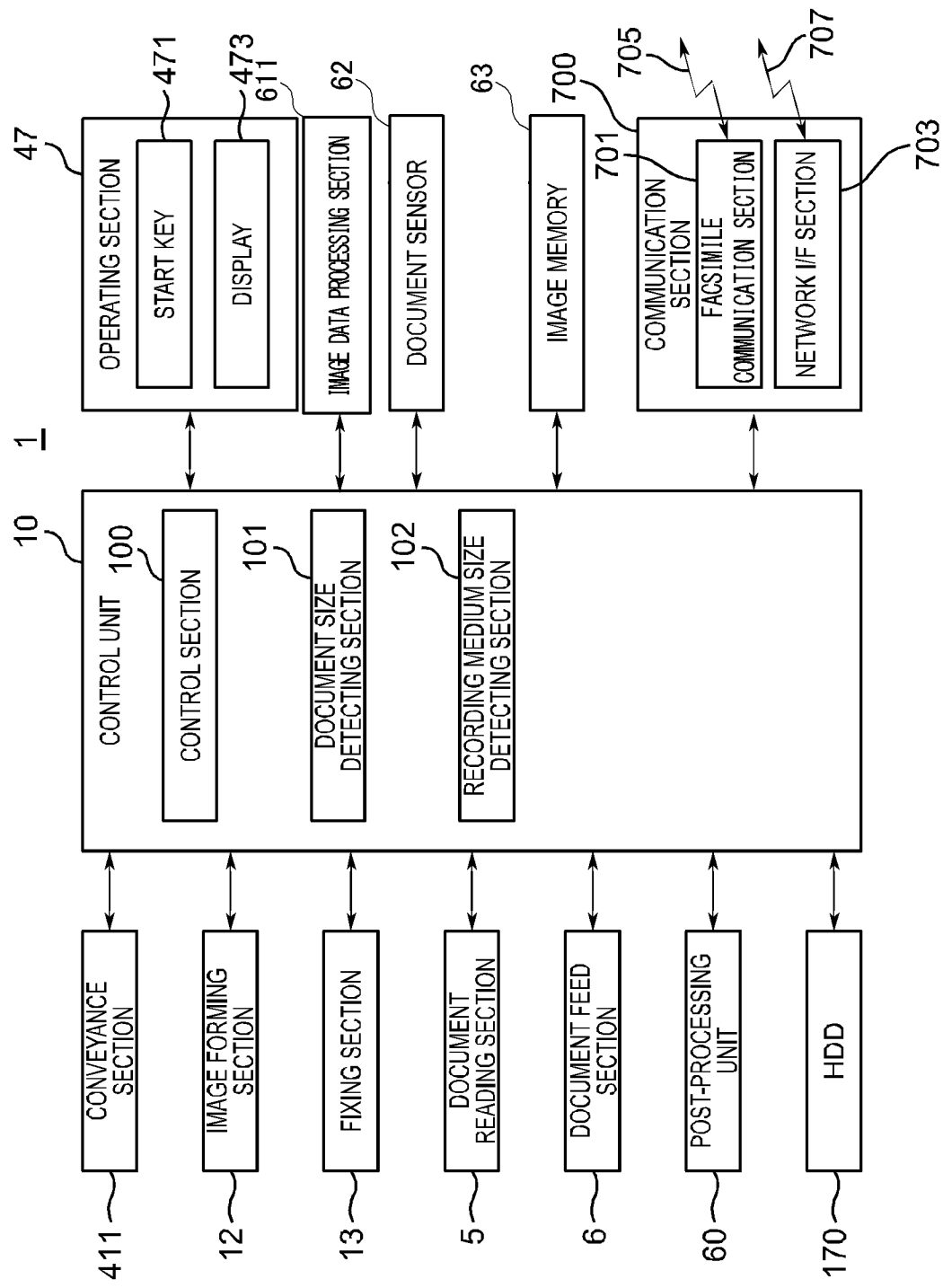
FIG. 2 is a block diagram showing the electric configuration of the image forming apparatus.

FIG. 2 is a block diagram showing the electric configuration of the image forming apparatus 1 shown in FIG. 1. The image forming apparatus 1 has a configuration in which a control unit 10, the apparatus body 11, the document reading section 5, the document feed section 6, the operating section 47, the post-processing unit 60, a communication unit 700, the image data processing section 611, and an HDD (hard disk drive) 170 are connected to each other via a bus. Since the components of the apparatus body 11, the document reading section 5, the document feed section 6, the operating section 47, and the post-processing unit 60 have already been described, a description thereof will not be repeated here.

The communication unit 700 includes a facsimile communication section 701 and a network I/F section 703. The facsimile communication section 701 includes an NCU (network control unit) operable to control the connection with a destination facsimile via a telephone network and a modem circuit operable to modulate and demodulate signals for facsimile communication. The facsimile communication section 701 can be connected to a telephone network 705.

The network I/F section 703 can be connected to a LAN (local area network) 707. The network I/F section 703 is a communication interface circuit for performing communication with terminal devices connected to the LAN 707, such as personal computers.

The HDD 170 is used to store image data output from the document reading section 5, image data sent from personal computers through the communication unit 700, image data received by facsimile through the communication unit 700, and so on.

A document sensor 62 is a sensor provided at the document placement table 61 of the document reading section 5 and configured to detect the size of each of original documents placed on the document placement table 61. For example, the document sensor 62 is composed of either one or both of (1) a sensor provided inside the document placement table 61 and configured to detect the document size by applying light to the original document lying thereabove through a light transmissive window and detecting edges of the original document depending upon whether to receive the reflected light and (2) a sensor configured to detect the document size by detecting the position of a document guide for alignment of the right and left edges and trailing edges of a stack of original documents placed on the document placement table 61. The document sensor 62 outputs the detection result to a document size detecting section 101 of the control unit 10. The combination of the document sensor 62 and the document size detecting section 101 is an example of the document size detecting section defined in "What is claimed is".

A description is given below of the control unit 10. The control unit 10 includes a CPU (central processing unit), a ROM (read only memory), a RAM (random access memory), and so on. The ROM stores software necessary for controlling the operation of the image forming apparatus 1. The RAM is used to temporarily store data generated during execution of software and store applications software.

The control unit 10 includes the control section 100, the document size detecting section 101, and a recording medium size selecting section 102.

The control section 100 governs the overall operation control of the image forming apparatus 1 and controls the operations of the mechanisms included in the image forming apparatus 1. Furthermore, the control section 100 controls the operation of image formation of the image forming section 12 based on image data sets generated by document reading in the document reading section 5. In addition, during image formation of the image forming section 12, the control section 100 performs, depending upon various conditions to be described later, the processing of setting an area of the recording paper sheet P on which an image is to be formed from each image data set.

The image forming apparatus 1 according to this embodiment has not only a normal mode for performing a normal image forming operation but also a mixed document size double-sided printing mode for double-sided printing for mixed original documents of different document sizes. Upon user's operation of the operating section 47, the control section 100 changes the operation mode of the image forming apparatus 1 to the mixed document size double-sided printing mode.

The document size detecting section 101 is configured to detect, based on the detection result acquired from the document sensor 62, the size of each of the original documents to be read by the document reading section 5. The document size detecting section 101 stores in advance the document widths and document lengths of various document sizes, such as A4 size, A3 size, B4 size, and B5 size. By reference to the stored document width and document length of each size, the document size detecting section 101 detects the document size matching the document width (in this case, the dimension in a direction perpendicular to the direction of conveyance of original document) and document length (in this case, the dimension in the direction of conveyance of original document) indicated by the detection result acquired from the document sensor 62.

The recording medium size selecting section 102 is configured to select the sizes of recording paper sheets P for use in forming images from image data sets of a plurality of original documents acquired by reading in the document reading section 5. In particular, in the case where a pair of image data sets to be placed on one and the other sides of a common recording paper sheet P during image formation in the image forming section 12 have different document sizes, the recording medium size selecting section 102 selects the size of a recording paper sheet P for use in forming images from the pair of image data sets, as will be described in detail later.

An image memory 63 provides a temporary storage region in which the image data sets of original documents read by the document reading section 5 are to be temporarily stored.

Figure 3:
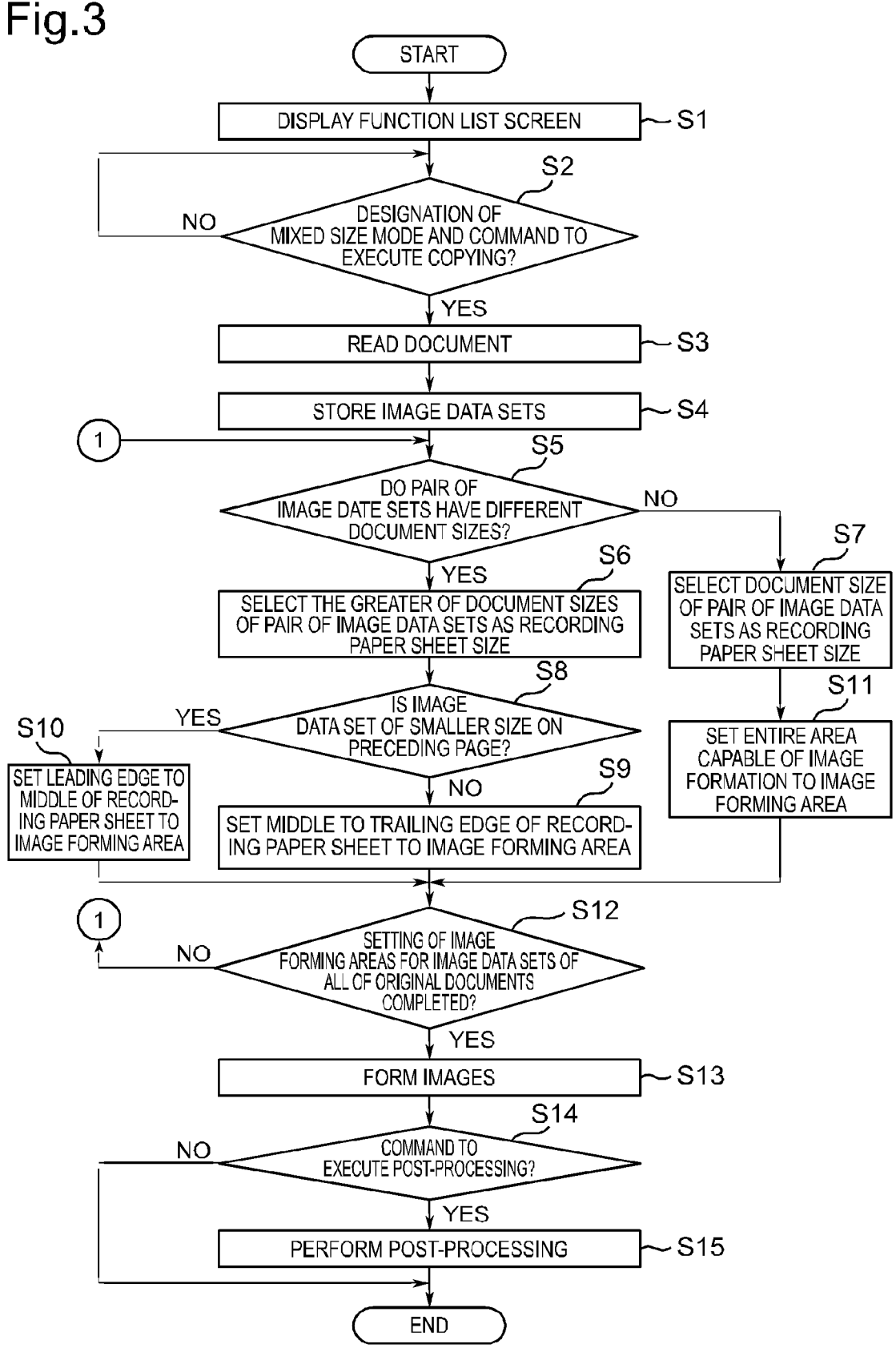
FIG. 3 is a flowchart showing a first embodiment of processing during mixed document size double-sided printing in the image forming apparatus.
Figure 4:
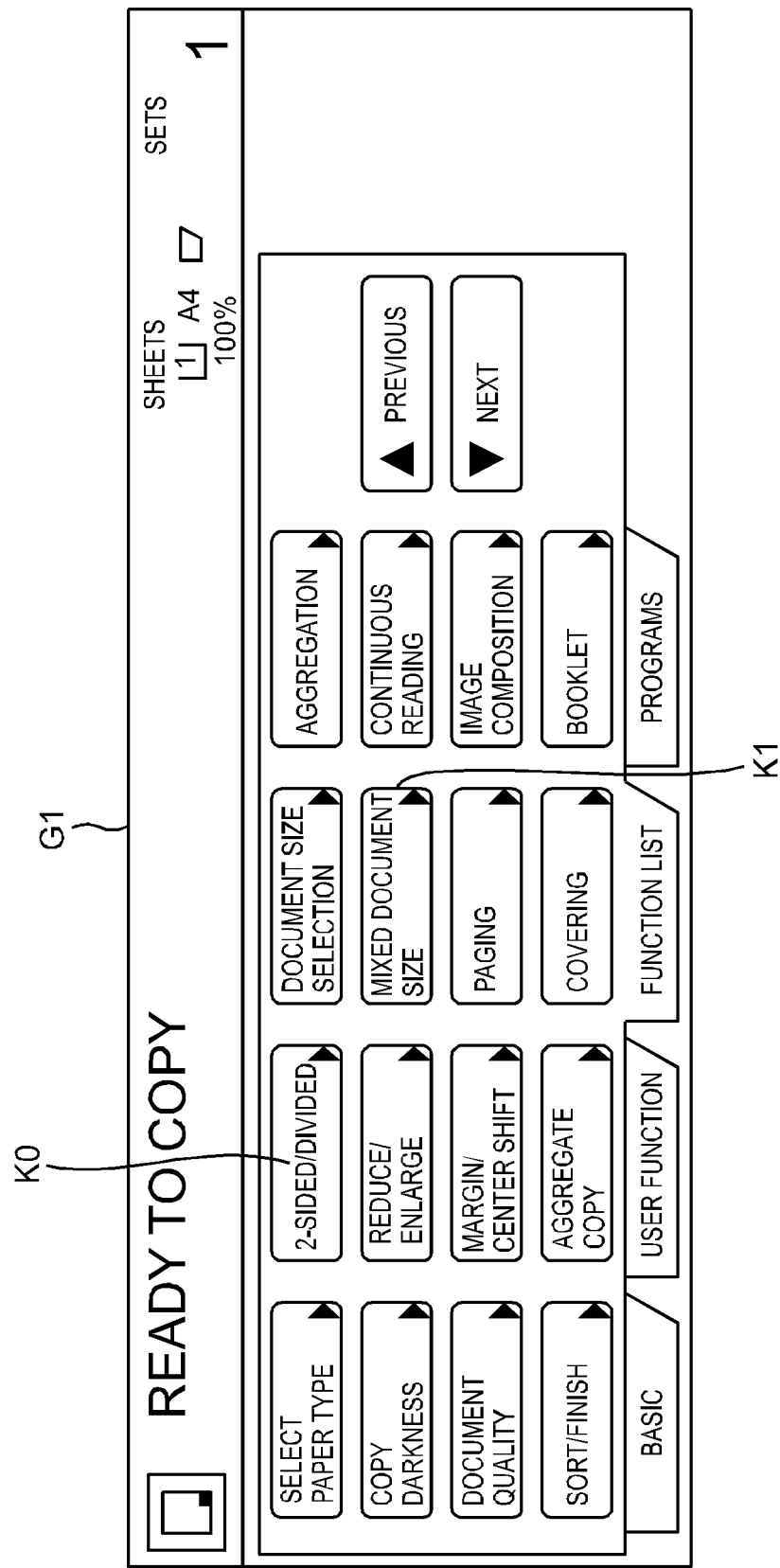
FIG. 4 is a view showing an example of a display screen of a display.
Figure 5:
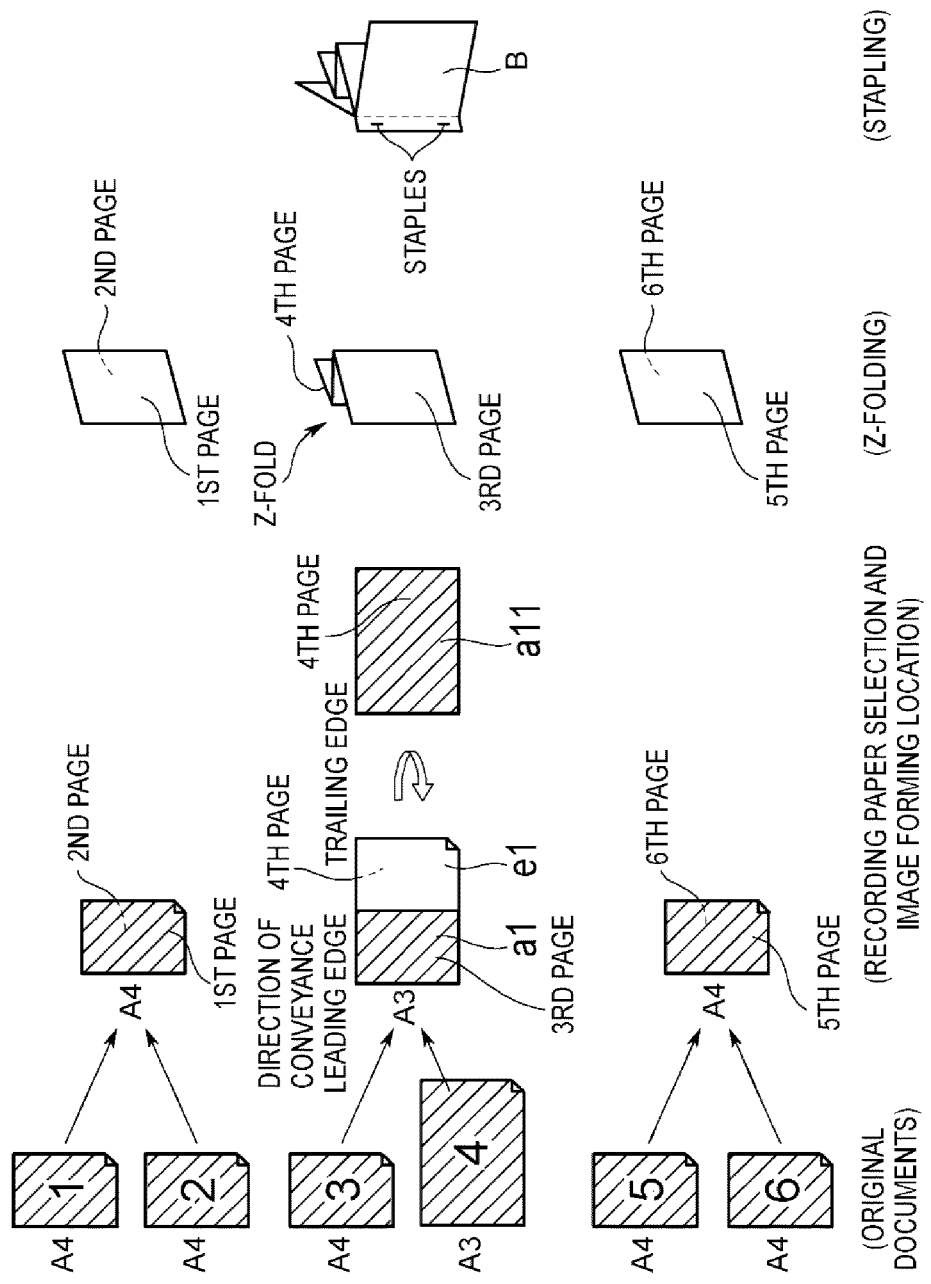
FIG. 5 is a diagram showing six original documents as original documents to be read and respective examples of recording paper sheet selection and image forming location, Z-folding, and stapling.
Figure 6:
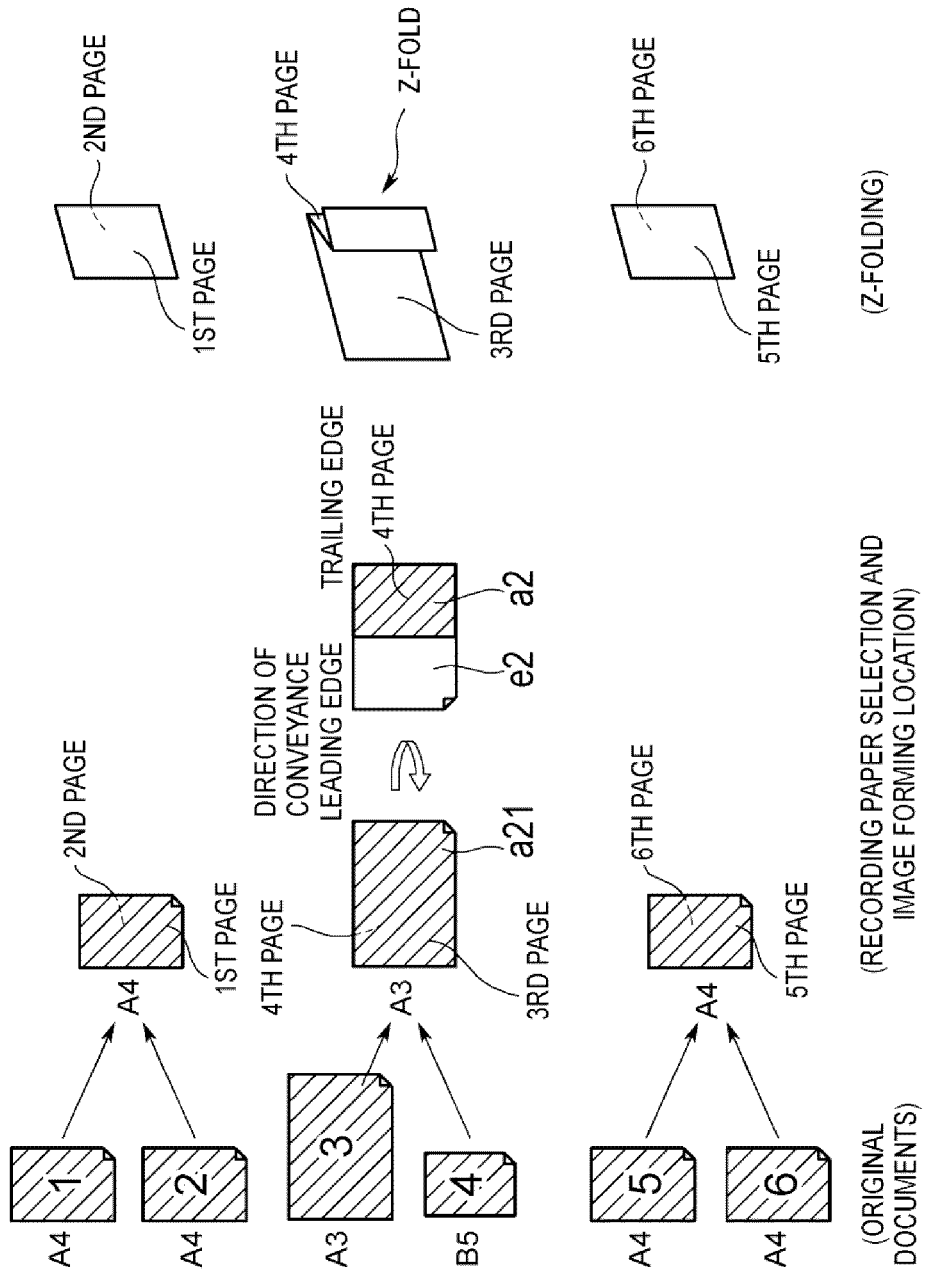
FIG. 6 is a diagram showing six original documents as original documents to be read and respective other examples of recording paper sheet selection and image forming location, Z-folding, and stapling.
Figure 7:
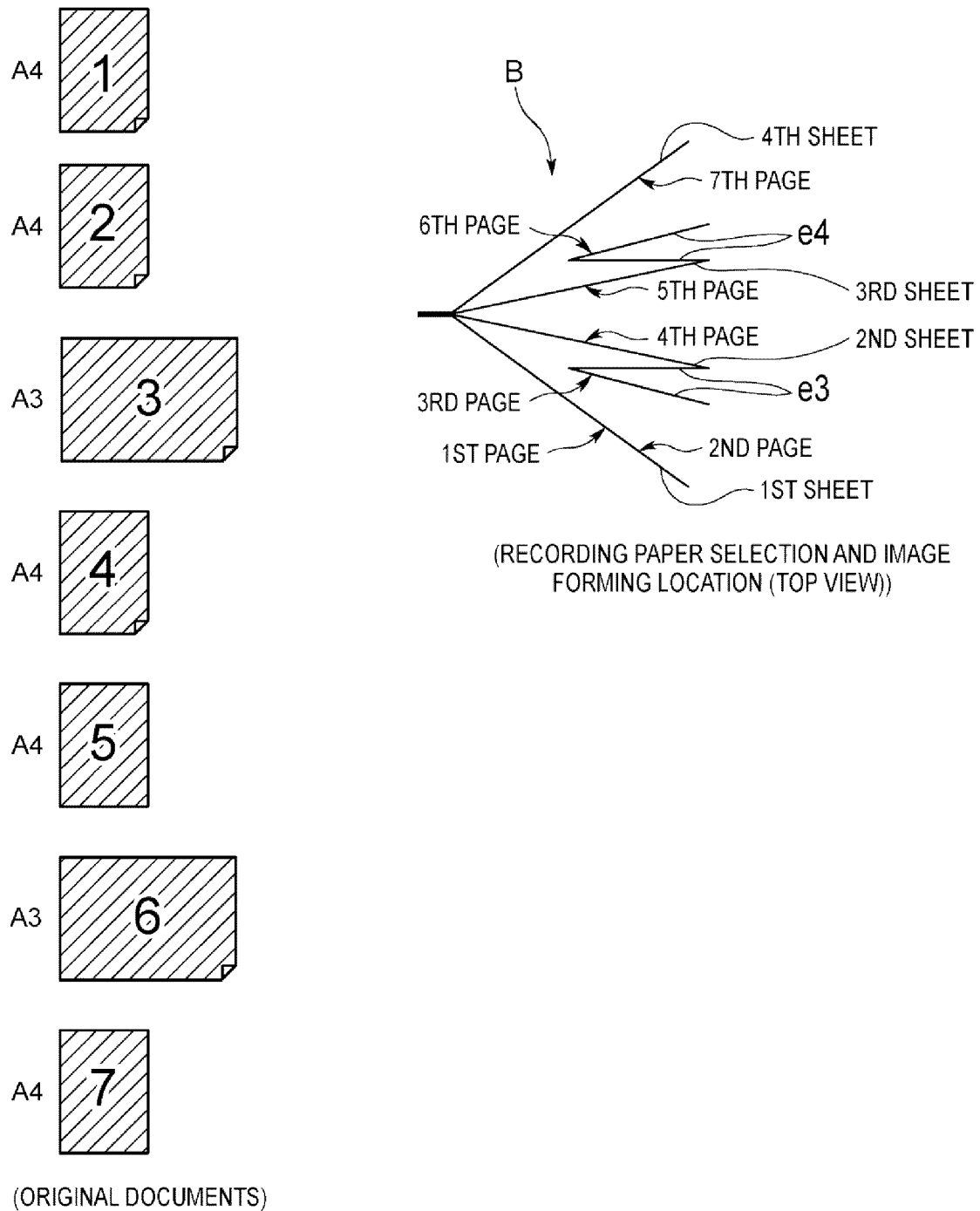
FIG. 7 is a diagram showing seven original documents as original documents to be read and an example of locations of images formed on recording paper sheets P and an example of Z-folded positions of the recording paper sheets P.

Next, with reference to FIG. 3, a description will be given of a first embodiment of processing and method for mixed document size double-sided printing using the image forming apparatus 1 according to this embodiment. FIG. 3 is a flowchart showing the first embodiment of processing during mixed document size double-sided printing in the image forming apparatus 1. FIG. 4 is a view showing an example of a display screen of the display 473. FIGS. 5 and 6 are diagrams each showing six original documents as original documents to be read and respective examples of recording paper sheet selection and image forming location, Z-folding, and stapling. FIG. 7 is a diagram showing seven original documents as original documents to be read and an example of locations of images formed on recording paper sheets P and an example of Z-folded positions of the recording paper sheets P.

In the first embodiment, consideration is given to the case where a stack of a plurality of original documents having the same document width but different document sizes is placed on the document placement table 61 of the document reading section 5 and the document reading section 5 reads the stack of original documents.

When the main power of the image forming apparatus 1 is turned on, the control section 100 allows the image forming apparatus 1 to stand by, ready for copying and allows the display 473 of the operating section 47 to display a function list screen G1 (FIG. 4) which is a default screen to be displayed on stand-by of the image forming apparatus 1 (S1).

When a command to execute reading of single-sided original documents in the document reading section 5 and double-sided printing of recording paper sheets in the image forming section 12 is input by an operator through the touch panel function such as with the push of the "2-Sided/Divided" key K0 on the function list screen G1, a command to execute a mixed document size reading operation is input through the touch panel function with the push of the "Mixed Document Size" key K1, and a command to execute copying is input by an operator's operation of the start key 471 of the operating section 47 (see FIG. 1) (YES in S2), the control section 100 changes the operation mode of the image forming apparatus 1 to the mixed document size double-sided printing mode for producing double-sided prints from image data sets of mixed original documents of different document sizes (S3). Specifically, the control section 100 allows the document reading section 5 to start reading of original documents placed on the document placement table 61.

The control section 100 allows the image memory 63 or the HDD 170 to store the image data sets of all of original documents read by the document reading section 5 (S4). Concurrently, the control section 100 allows the image memory 63 or the HDD 170 to store, in association with each image data set, information about the document size of the image data set detected by the document sensor 62 and the document size detecting section 101 and information about to which page of the original documents the image data set corresponds as well.

The mixed document size reading operation refers to an operation of reading a plurality of original documents of different document sizes placed on the document placement table 61. Furthermore, in this embodiment, a designation of a recording paper sheet size automatic setting mode for setting the size of the recording paper sheet for use in forming an image from each image data set acquired by the above document reading in the document reading section 5, not by a command from an operator, but by the image forming apparatus 1 itself is input by the operator's operation of the operating section 47. Thus, the control section 100 performs the above reading of single-sided original documents and double-sided printing of recording paper sheets in the recording paper sheet size automatic setting mode. Moreover, as described previously, a plurality of original documents having the same document width but different document sizes are read by the document reading section 5.

Subsequently, the recording medium size selecting section 102 selects the sizes of recording paper sheets P for use in forming images from the image data sets of the plurality of original documents acquired by reading in the document reading section 5 (S5 to S11).

The following is a description of processing for selecting the sizes of recording paper sheets P in the recording medium size selecting section 102. For example, a description is given of the case where six original documents having the same document width but different document sizes are read by the document reading section 5, as shown in FIG. 5. Here, the six original documents include the first to third, fifth, and sixth documents of A4 size and the fourth document of A3 size.

First, the recording medium size selecting section 102 determines whether or not, out of the image data sets of the original documents stored in S4, a pair of image data sets which will constitute two pages to be placed on one and the other sides of a common recording paper sheet P by image formation of the image forming section 12 have different document sizes, based on the image data sets of the first and second original documents (S5).

If the recording medium size selecting section 102 determines that the pair of image data sets to be placed on one and the other sides of the common recording paper sheet P have the same document size (NO in S5), it selects the document size of this pair of image data sets as the size of the recording paper sheet P for use in forming images from this pair of image data sets (S7).

Then, the control section 100 sets a predetermined default image forming area of the recording paper sheet P, for example, an entire area capable of image formation, as an image forming area for each of the pair of image data sets (S11).

On the other hand, if the recording medium size selecting section 102 determines that the pair of image data sets have different document sizes (YES in S5), that is, if one of the pair of image data sets has a greater document size than the other, it selects the same document size as the greater document size as the size of the recording paper sheet P for use in forming images from this pair of image data sets (S6).

Then, the control section 100 determines whether or not, out of the pair of image data sets, the image data set of smaller document size (the image data set having a document size smaller than the size of the recording paper sheet) constitutes the page preceding the other image data set of greater document size (S8).

If the control section 100 determines that the image data set of smaller document size constitutes the page preceding the image data set of greater document size (YES in S8), it sets an area from the leading edge to the middle of the recording paper sheet P in the direction of conveyance thereof by the conveyance section 411 as the image forming area for the image data set constituting the preceding page (S10).

On the other hand, if the control section 100 determines that the image data set of smaller document size constitutes the page following the image data set of greater document size (NO in S8), it sets an area from the middle to the trailing edge of the recording paper sheet P in the direction of conveyance thereof by the conveyance section 411 as the image forming area for the image data set constituting the preceding page (S9).

Furthermore, the control section 100 determines whether or not the image data sets of all of the original documents stored such as in the image memory 63 have undergone the processing from S5 to S11 (S12). If the control section 100 determines that one or some of the image data sets have not yet undergone the processing from S5 to S11 (NO in S12), the processing from S5 to S11 is repeated for each unprocessed image data set.

On the other hand, if the control section 100 determines that the image data sets of all of the original documents have undergone the processing from S5 to S11 (YES in S12), it allows the conveyance section 411 to convey to the image forming section 12 the recording paper sheets P of sizes selected in the above manner for the image data sets of all of the original documents stored such as in the image memory 63 and then allows the image forming section 12 to form images on the set image forming areas of the recording paper sheets P (S13).

For example, in the case of six original documents shown in FIG. 5, as for the pair of first and second original documents and the pair of fifth and sixth original documents, the pair of image data sets to be formed as images on one and the other sides of a single recording paper sheet P have the same document size, A4. Therefore, the recording medium size selecting section 102 selects A4 as the size of the recording paper sheet P for use in forming the images and the control section 100 sets the entire area capable of image formation, which is the predetermined default image forming area, as the image forming area for each of the image data sets.

On the other hand, for the pair of third and fourth original documents, one of the pair of image data sets to be formed as images on one and the other sides of a single recording paper sheet P has a document size of A4 and the other has a document size of A3. Therefore, the recording medium size selecting section 102 selects A3 as the size of the recording paper sheet P for use in forming the images. The control section 100 sets, as the image forming area for the image data set which will constitute the preceding third page, an area a1 from the leading edge to the middle of the A3-size recording paper sheet P in the direction of conveyance thereof, as shown in FIG. 5. Furthermore, the control section 100 sets, as the image forming area for the image data set which will constitute the following fourth page, the entire area all capable of image formation in the A3-size recording paper sheet P, as shown in FIG. 5.

As another example, suppose that, as shown in FIG. 6, six original documents are to be read by the document reading section 5, the first, second, and fourth to sixth original documents have a document size of A4, and the third document has a document size of A3. As for the pair of first and second original documents and the pair of fifth and sixth original documents, the pair of image data sets to be formed as images on one and the other sides of a single recording paper sheet P have the same document size, A4. Therefore, the recording medium size selecting section 102 selects A4 as the size of the recording paper sheet P for use in forming the images and the control section 100 sets the entire area capable of image formation, which is the predetermined default image forming area, as the image forming area for each of the image data sets.

On the other hand, for the pair of third and fourth original documents, previous one of the pair of image data sets to be formed as images on one and the other sides of a single recording paper sheet P, i.e., the image data set which will constitute the preceding third page, has a document size of A3 and the other image data set, which will constitute the following fourth page, has a document size of A4. Therefore, the recording medium size selecting section 102 selects A3 as the size of the recording paper sheet P for use in forming the images. The control section 100 sets, as the image forming area for the image data set which will constitute the fourth page, an area a2 from the middle to the trailing edge of the recording paper sheet P in the direction of conveyance thereof. Furthermore, the control section 100 sets, as the image forming area for the image data set which will constitute the preceding third page, the entire area a21 capable of image formation in the A3-size recording paper sheet P, as shown in FIG. 6.

With the above configuration, during mixed document size double-sided printing, the size of each single recording paper sheet P on both sides of which images are to be formed from respective image data sets of a pair of original documents is selected depending upon, out of the pair of image data sets, the image data set of the original document of greater size. This avoids as much as possible the occurrence of image defect upon image formation from the pair of image data sets on a recording medium. In addition, since in the above manner the size of a recording paper sheet P for use is selected and a pair of image data sets constituting two pages are formed as images on both sides of the recording paper sheet P to produce a double-sided print, a set of prints finally obtained by the image formation includes a reduced number of single-sided prints, which can reduce the number of recording paper sheets P used for the image formation.

Furthermore, depending upon whether the page on which, out of the pair of image data sets to be formed as images on one and the other sides of a single recording paper sheet P, the image data set of smaller document size is to be formed as an image precedes or follows the page on which the other image data set of greater document size is to be formed as an image, it is determined whether the image data set of smaller document size is formed in the area from the leading edge to the middle of the recording paper sheet P in the direction of conveyance thereof or in the area from the middle to the trailing edge thereof. Therefore, for example, in the case of binding a set of prints formed of a plurality of printed recording paper sheets P at the leading end portions of the recording paper sheets P, the document image for the image data set of smaller document size can be placed close to the side of the recording paper sheet P to be bound.

Hence, for the recording paper sheet P on which the image data sets of the third and fourth original documents are to be formed as images as shown in FIG. 5, if an operator folds the recording paper sheet P, such as by Z-folding as shown in FIGS. 5 and 6, at an empty space e1 of the recording paper sheet P or an empty space e2 of the recording paper sheet P shown in FIG. 6, which are created by the placement of the document image close to one side of the recording paper sheet P, the page size of the recording paper sheet P can be adjusted to fit the size of the other recording paper sheets while the reduction of visibility of the image on the area a1 or a2 of the recording paper sheet P can be minimized.

After the formation of images in S13, the control section 100 determines whether or not a command to execute post-processing has been input upon operator's input of the command to execute copying (S14). If the control section 100 determines that a command to execute post-processing has been input (YES in S14), it allows the post-processing unit 60 to perform post-processing of stapling or punching designated by the operator (S15). Thereafter, the process ends. If the control section 100 determines that no command to execute post-processing has been input (NO in S14), it does not allow the post-processing unit 60 to perform post-processing and the process ends.

When post-processing is performed in the above manner to bind a set of prints formed of a stack of printed recording paper sheets P, the document image for the image data set of smaller document size is placed close to the side of the stack of recording paper sheets P to be bound. Therefore, for example, by folding the recording paper sheet P at the above empty space e1, e2 created by the placement of the document image close to the side of the stack of recording paper sheets P to be bound, the page size of the recording paper sheet P can be adjusted to fit the size of the other recording paper sheets P while the reduction of visibility of the image on the recording paper sheet P can be minimized. Thus, as shown in FIG. 5, a printed matter B having a pleasing appearance can be obtained in which a set of prints formed of the stack of recording paper sheets P are aligned at ends.

As still another example, suppose, as shown in FIG. 7, that seven original documents are objects to be read by the document reading section 5, the first, second, fourth, fifth, and seventh original documents are of A4 size, and the third and sixth original documents are of A3 size. In this case, the aforementioned size selection of recording paper sheets P and image formation results in a printed matter B. In this case, in the second and third recording paper sheets P having empty spaces created, the created empty spaces e3, e4 are hidden inside by Z-folding as shown in FIG. 7.

Therefore, on the third page located on the second recording paper sheet P, part of the formed image is visible even in Z-folded state. On the fourth page, the entire formed image is visible without being hidden by the Z-fold, while the empty space e3 is invisible because it is hidden by the Z-fold. Also on the fifth and sixth pages located on the third recording paper sheet P, the same applies although the Z-folding is otherwise oriented. Thus, a printed matter B can be obtained in which the side edges of the recording paper sheets P are aligned and the reduction of reader's readability is minimized.

Furthermore, the image forming apparatus 1 according to this embodiment includes the operating section 47 operable to receive user's operation and performs an image forming operation in response to the user's operation using the operating section 47. By the operation of the operating section 47, the user can execute double-sided printing for mixed original documents of different document sizes. Thus, an image forming apparatus having excellent user-friendliness can be provided which can provide not only a normal mode for performing a normal image forming operation but also a mixed document size double-sided printing mode for performing double-sided printing for original documents of mixed document sizes.

As thus far described, in the above example of the mixed document size double-sided printing using the image forming apparatus 1 according to this embodiment, A4 and A3 original documents having the same document width are concurrently placed on the document reading section 5. However, the original documents concurrently placed on the document reading section 5 may be a plurality of mixed original documents containing B5 and B4 sizes having the same document width.

Although in the first embodiment of the processing the number of original documents to be read is six or seven, it may be naturally any other plurality of original documents. Various modifications can be made of the location of greater-size original documents.

Figure 8:
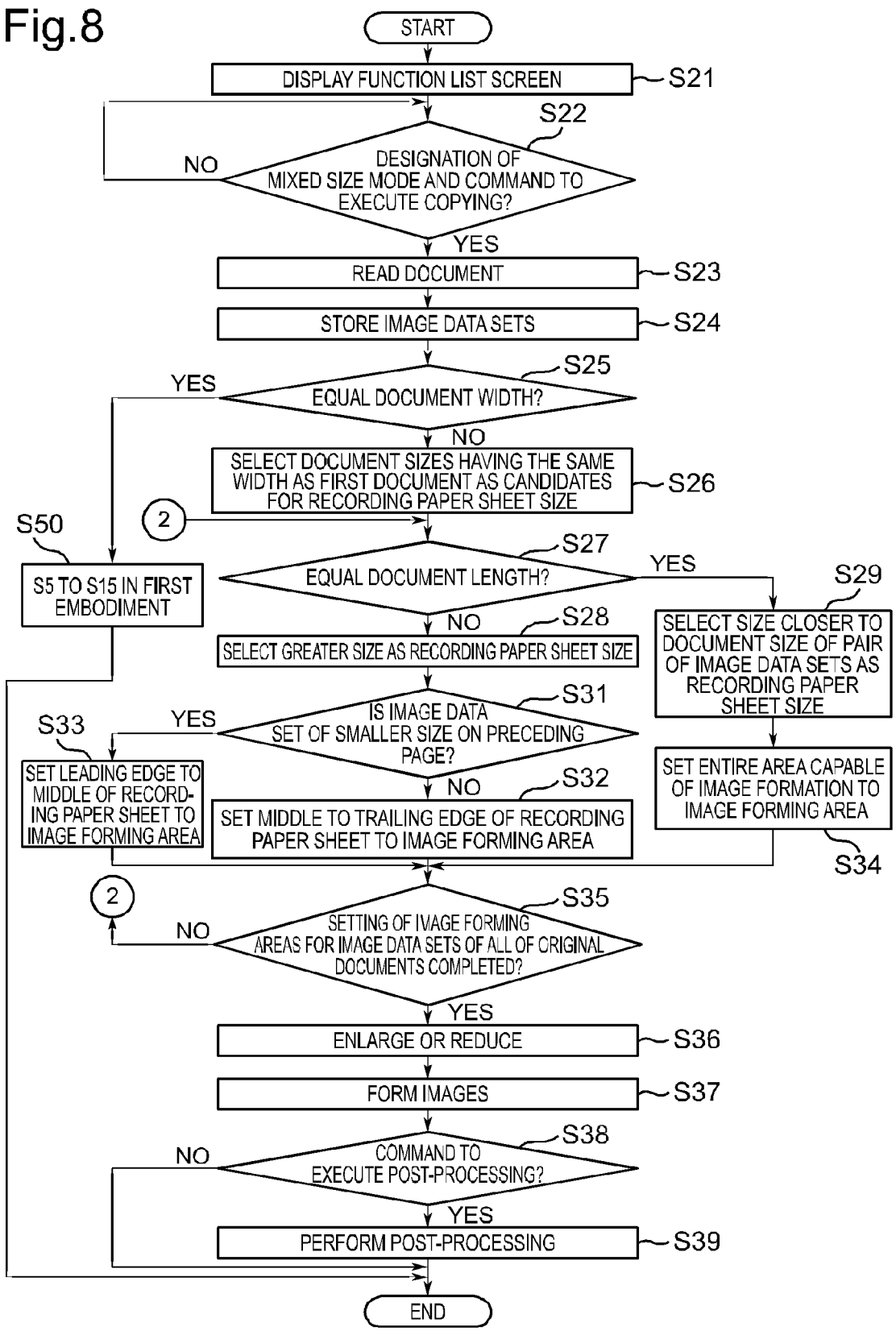
FIG. 8 is a flowchart showing a second embodiment of processing during mixed document size double-sided printing in the image forming apparatus.
Figure 9:
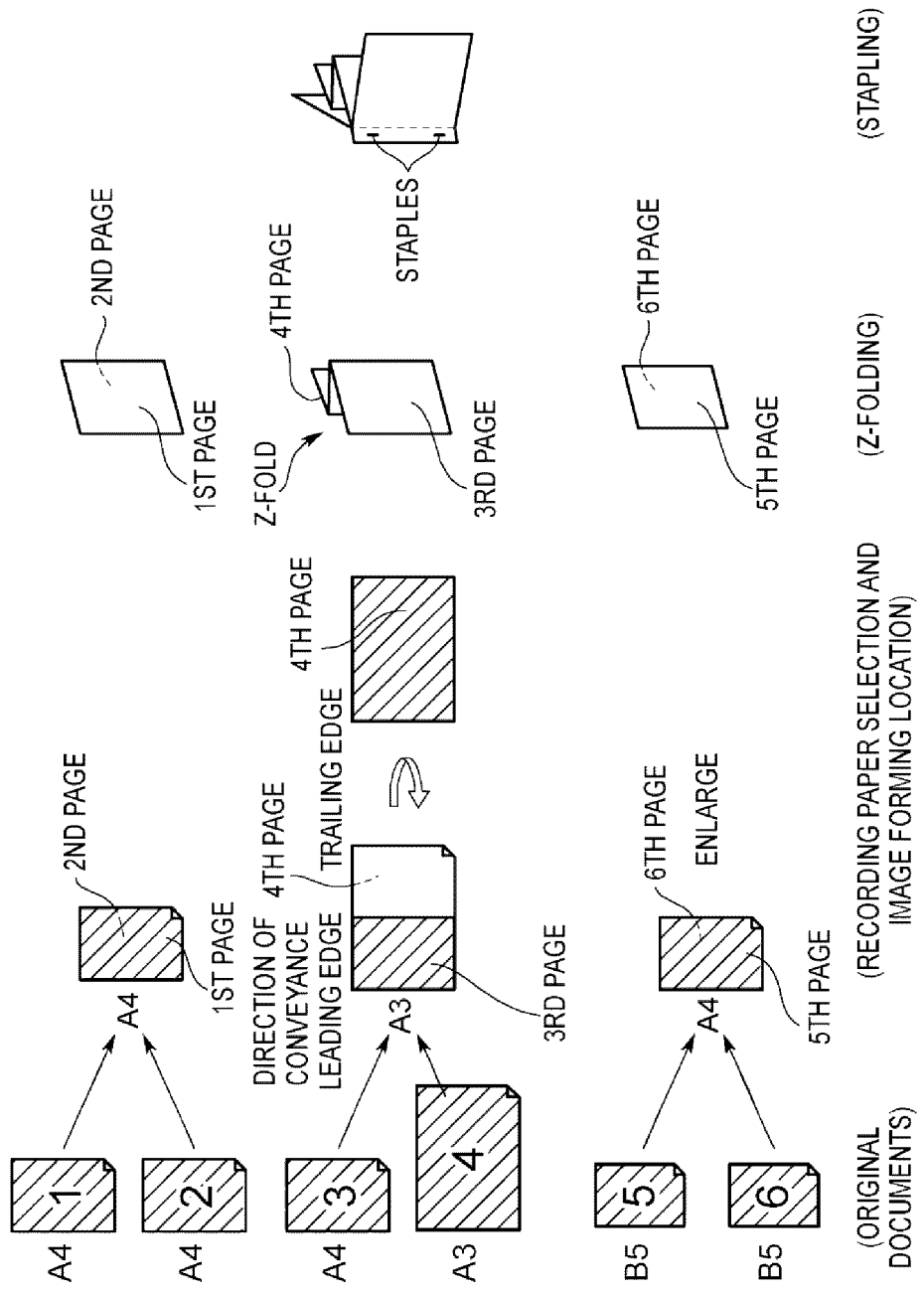
FIG. 9 is a diagram showing six original documents as original documents to be read and respective other examples of recording paper sheet selection and image forming location, Z-folding, and stapling.

Next, with reference to FIG. 8, a description will be given of a second embodiment of processing and method for mixed document size double-sided printing using the image forming apparatus 1 according to this embodiment. FIG. 8 is a flowchart showing the second embodiment of processing during mixed document size double-sided printing in the image forming apparatus 1. FIG. 9 is a diagram showing six original documents as original documents to be read and respective other examples of recording paper sheet selection and image forming location, Z-folding, and stapling. The description of the same pieces of processing as in the first embodiment is not given here.

In the second embodiment, consideration is given to the case where a stack of a plurality of original documents having different document widths and different document sizes is placed on the document placement table 61 of the document reading section 5 and the document reading section 5 reads the stack of original documents. Also in the second embodiment, the control section 100 performs the reading of single-sided original documents and double-sided printing of recording paper sheets in the recording paper sheet size automatic setting mode.

Also in the second embodiment, after the image data sets of all of original documents read by the document reading section 5 are stored (S24), the recording medium size selecting section 102 selects the sizes of recording paper sheets P for use in forming images from the image data sets of the original documents (S25 to S29). In this case, the recording medium size selecting section 102 first determines whether or not the document widths indicated by the document sizes of all of the stored image data sets are equal (S25).

If the recording medium size selecting section 102 determines that the document widths of all of the image data sets are equal (YES in S25), the same pieces of processing as those of S5 and later in the first embodiment are performed (S50).

On the other hand, if the recording medium size selecting section 102 determines that the document widths of the image data sets are not equal, i.e., the image data sets have document sizes of mixed document widths (NO in S25), it selects recording paper sheet sizes having the same width as the document size of the image data set of the first original document as candidates for the size of recording paper sheets for use in forming images from all of the image data sets (S26). For example, if the document size of the image data set of the first original document is A4 or A3, the recording medium size selecting section 102 selects, as candidates for the size of recording paper sheets for use, both recording paper sheet sizes of A4 and A3 having the same width as the document size. Alternatively, if the document size of the image data set of the first original document is B5 or B4, the recording medium size selecting section 102 selects, as candidates for the size of recording paper sheets for use, both recording paper sheet sizes of B4 and B5 having the same width as the document size.

Subsequently, the recording medium size selecting section 102 determines whether or not, out of image data sets of the original documents stored in the image memory 63 or the like in S24, a pair of image data sets which will constitute two pages to be placed on one and the other sides of a common recording paper sheet P by image formation of the image forming section 12 are equal in document length of document size, based on the image data sets of the first and second original documents (S27).

If the recording medium size selecting section 102 determines that the document lengths of the document sizes of the pair of image data sets are not equal, i.e., one of the image data sets has a greater document length than the other (NO in S27), it selects the greater of the candidate recording paper sheet sizes as the size of the recording paper sheet P for use in forming images from the pair of image data sets (S28).

For example, if the candidate recording paper sheet sizes are A4 and A3 sizes, the recording medium size selecting section 102 selects A3 size as the size of the recording paper sheet in S28. If the candidate recording paper sheet sizes are B5 and B4 sizes, the recording medium size selecting section 102 selects B4 size as the size of the recording paper sheet in S28.

On the other hand, if the recording medium size selecting section 102 determines that the document lengths of the document sizes of the pair of image data sets are equal (YES in S27), it selects, out of the candidate recording paper sheet sizes, the size closer to the document size of the pair of image data sets as the size of the recording paper sheet P for use in forming images from the pair of image data sets (S29).

For example, if the candidate recording paper sheet sizes are B5 and B4 and the document size of the pair of image data sets is B5 or A4, the recording medium size selecting section 102 selects B5 as the size of the recording paper sheet in S29. If the candidate recording paper sheet sizes are B5 and B4 and the document size of the pair of image data sets is B4 or A3, the recording medium size selecting section 102 selects B4 as the size of the recording paper sheet in S29. Alternatively, for example, if the candidate recording paper sheet sizes are A4 and A3 and the document size of the pair of image data sets is B5 or A4, the recording medium size selecting section 102 selects A4 as the size of the recording paper sheet. If the candidate recording paper sheet sizes are A4 and A3 and the document size of the pair of image data sets is B4 or A3, the recording medium size selecting section 102 selects A3 as the size of the recording paper sheet.

After S29, the control section 100 sets an entire area capable of image formation in the recording paper sheet P of selected size, which is a predetermined default image forming area, as an image forming area for each of the pair of image data sets (S34).

On the other hand, after S28, the control section 100 performs the same pieces of processing as S8 to S10 described in the first embodiment to set the image forming area for the image data set in the recording paper sheet P of selected size (S31 to S33).

Thereafter, the control section 100 determines whether or not the image data sets of all of the original documents stored such as in the image memory 63 have undergone the processing from S27 to S34 (S35). If the control section 100 determines that one or some of the image data sets have not yet undergone the processing from S27 to S34 (NO in S35), the processing from S27 to S34 is repeated for each unprocessed image data set.

On the other hand, if the control section 100 determines that the image data sets of all of the original documents have undergone the processing from S27 to S34 and the setting of the image forming areas of the recording paper sheets P for the image data sets of all of the original documents is completed (YES in S35), the image data processing section 611 enlarges or reduces the size of each of the image data sets of all of the original documents to the size of the set image forming area so that each image data set can be formed as an image in appropriate proportion in the set image forming area (S36).

As an example, suppose that, as shown in FIG. 9, six original documents are objects to be read, the first, second, and third original documents are of A4 size, the fourth original document is of A3 size, and the fifth and sixth original documents are of B5 size. In this case, the recording medium size selecting section 102 selects A4 and A3 sizes as candidate recording paper sheet sizes. Then, the recording medium size selecting section 102 selects A4 size as the size of a common recording paper sheet P for use in forming images from the pair of image data sets which will constitute the first and second pages to be placed on one and the other sides of the common recording paper sheet P.

Next, the recording medium size selecting section 102 selects A3 size, which is the greater of A4 and A3 sizes, as the size of a common recording paper sheet P for use in forming images from the pair of image data sets which will constitute the third and fourth pages to be placed on one and the other sides of the common recording paper sheet P.

Next, the recording medium size selecting section 102 selects A4 size, which is the smaller of A4 and A3 sizes, as the size of a common recording paper sheet P for use in forming images from the pair of image data sets which will constitute the fifth and sixth pages to be placed on one and the other sides of the common recording paper sheet P. In this case, since the original size of the image data sets which will constitute the fifth and sixth pages is B5, they are enlarged to the size of the image forming area of the recording paper sheet P of A4 size by the image data processing section 611.

Thereafter, the control section 100 allows the conveyance section 411 to convey the recording paper sheets P of sizes selected in the above manner for the image data sets of all of the original documents to the image forming section 12 and allows the image forming section 12 to form images on the set image forming areas of the recording paper sheets P (S37). If a command to execute post-processing has been issued by the user (YES in S38), the control section 100 allows the post-processing unit 60 to perform post-processing of stapling or punching designated by the user (S39).

With the second embodiment, even if original documents to be read by the document reading section 5 have different document widths, a printed matter can be obtained by the above image formation while the recording paper sheets P forming the printed matter have a unified size and the reduction of reader's readability is minimized.

Figure 10:
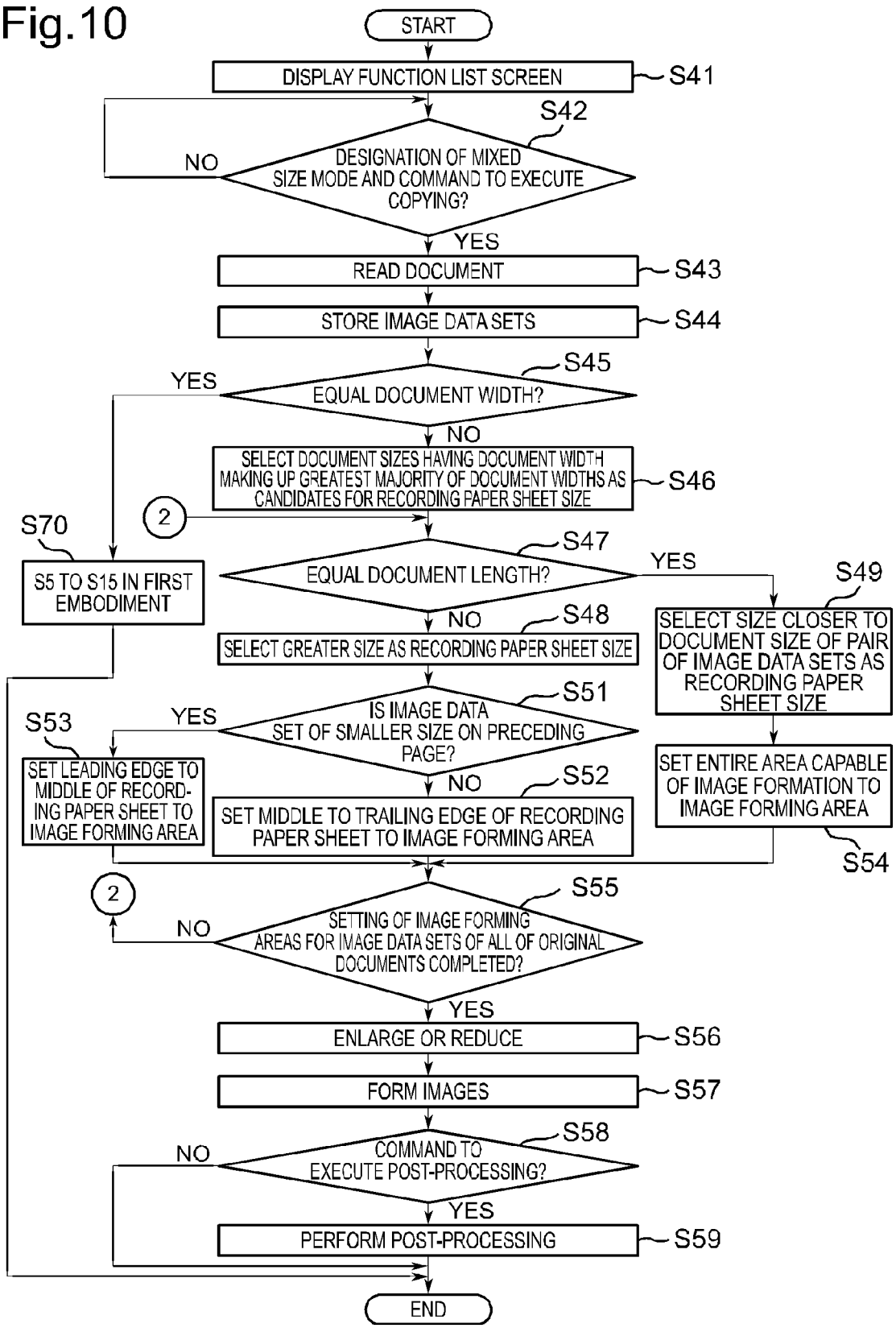
FIG. 10 is a flowchart showing a third embodiment of processing during mixed document size double-sided printing in the image forming apparatus.

Next, with reference to FIG. 10, a description will be given of a third embodiment of processing and method for mixed document size double-sided printing using the image forming apparatus 1 according to this embodiment. FIG. 10 is a flowchart showing the third embodiment of processing during mixed document size double-sided printing in the image forming apparatus 1. FIG. 11 is a diagram showing six original documents as original documents to be read and respective other examples of recording paper sheet selection and image forming location, Z-folding, and stapling. The description of the same pieces of processing as in the first and second embodiments is not given here.

Also in the third embodiment, consideration is given to the case where a stack of original documents having different document widths and different document sizes is placed on the document placement table 61 of the document reading section 5, the document reading section 5 reads the stack of original documents, and the control section 100 performs the reading of single-sided original documents and double-sided printing of recording paper sheets in the recording paper sheet size automatic setting mode.

Also in the third embodiment, after the image data sets of all of the original documents read by the document reading section 5 are stored (S44), the recording medium size selecting section 102 determines, as processing for selecting the sizes of recording paper sheets P, whether or not the document widths indicated by the document sizes of all of the stored image data set are equal (S45).

If the recording medium size selecting section 102 determines that the document widths of all of the image data sets are equal (YES in S45), the same pieces of processing as those of S5 and later in the first embodiment are performed (S70).

On the other hand, if the recording medium size selecting section 102 determines that the document widths of the image data sets are not equal, i.e., the image data sets have document sizes of mixed document widths (NO in S45), it selects document sizes having a document width making up the greatest majority of the document widths indicated by the document sizes of all of the image data sets as candidates for the size of recording paper sheets for use in forming images from all of the image data sets (S46).

As an example, suppose that, as shown in FIG. 11, the document size of the image data set of the first original document is A4, the document size of the image data sets of the second and fourth to sixth original documents is B5, and the document size of the image data set of the third original document is A3. In this case, the set of original documents include two original documents having a document width of A3 and A4 sizes and four original documents having a document width of B5 and B4 sizes. Therefore, the recording medium size selecting section 102 adopts the document width of B5 and B4 sizes making up a greater majority and selects recording paper sheet sizes of B5 and B4 as candidates for the size of recording paper sheets for use in forming images from all of the image data sets.

Thereafter, pieces of processing from S47 to S59 which are the same as those from S27 to S39 in the second embodiment are performed.

With the third embodiment, even if original documents to be read by the document reading section 5 have different document widths, a printed matter can be obtained by the image formation while the recording paper sheets P forming the printed matter have a unified size to fit the document size making up the greatest majority of document sizes of the original documents to be read and the reduction of reader's readability is minimized.

The first to third embodiments according to the present disclosure have been thus far described. To sum up, in these embodiments, if, out of image data sets of a plurality of original documents acquired by reading of the document reading section 5, one of a pair of image data sets to be placed on one and the other sides of a common recording paper sheet P during image formation of the image forming section 12 has a greater document length than the other, the recording medium size selecting section 102 selects, as the size of a recording medium for use in forming images from the pair of image data sets, a recording paper sheet size having a greater length in the direction of conveyance of the recording medium than the image data set having the smaller document length.

The conventional image forming apparatus can prevent image defect from being caused by the fact that an image to be formed on a recording paper sheet of greater size has been formed on a recording paper sheet of smaller size. However, a resultant set of prints contain recoding paper sheets printed on both sides and recording paper sheets printed on one side only, which increases the number of recording paper sheets used. Furthermore, a printed matter obtained from the set of prints contains at least two adjacent recording paper sheets, each sheet blank on the reverse side, which may reduce the readability of the printed matter.

In contrast, with the above embodiments according to the present disclosure, as described previously, the occurrence of image defects and blank reverse sides upon mixed document size double-sided printing can be prevented as much as possible and double-sided printing for original documents of mixed sizes can be achieved without reducing the readability of a resultant printed matter.

The present disclosure is not limited to the above embodiments and can be modified in various ways. Although the description of the above embodiments is given taking multifunction peripheral as an example of the image forming apparatus according to the present disclosure, the example is merely illustrative and the image forming apparatus may be any image forming apparatus other than the multifunction peripheral, such as a copier, a scanner or a facsimile machine.

The structures, pieces of processing, and methods shown in the above embodiments with reference to FIGS. 1 to 11 are merely illustrative of the present disclosure and not intended to limit the present disclosure to the above particular structures, pieces of processing, and methods.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
a document reading section configured to read one side of each of mixed original documents of different document sizes constituting a plurality of pages to generate respective image data sets of the original documents;
a document size detecting section configured to detect respective sizes of the original documents to be read by the document reading section;
an image forming section configured to form images on both sides of recording media from the image data sets of the original documents generated by the document reading section;
a recording medium size selecting section that when, out of the image data sets of the original documents generated by the document reading section and constituting the plurality of pages, one of a pair of image data sets to be placed on one and the other sides of a common recording medium by image formation of the image forming section is greater in length of the document size detected by the document size detecting section than the other image data set, the length being a dimension in a direction of conveyance of the recording medium, selects, as a size of the recording medium for use in forming images from the pair of image data sets, a size having a greater length in the direction of conveyance of the recording medium than the other image data set;
a conveyance section configured to convey the recording medium of the size selected by the recording medium size selecting section to the image forming section; and
a control section configured to allow the image forming section to form, on the recording media conveyed by the conveyance section, images from the image data sets of the original documents and configured, when the other of the pair of the image data sets to be placed on one and the other sides of the common recording medium is to be formed as an image on a page preceding the one of the pair of image data sets, to allow the image forming section to form the image from the other image data set on an area from a leading edge to a middle of the recording medium in the direction of conveyance of the recording medium by the conveyance section,
wherein when the image data sets of the plurality of original documents constituting the plurality of pages are equal in a width of the document size in a direction perpendicular to the direction of conveyance of the recording medium and when, out of the image data sets of the plurality of original documents, one of the pair of image data set to be placed on one and the other side of the common recording medium has a greater document size than the other, the recording medium size selecting section selects the same size as the greater document size as the size of the recording medium for use in forming images from the pair of image data sets, and
when the image data sets of the plurality of original documents constituting the plurality of pages are different in the width of the document size, the recording medium size selecting section selects a size of recording medium having the same width as the width making up the greatest majority of the different widths of the image data sets of the plurality of original documents as the size of the recording medium for use in forming images from the image data sets of the plurality of original documents.

2. The image forming apparatus according to claim 1, wherein when the other of the pair of image data sets to be placed on one and the other sides of the common recording medium is to be formed as an image on a page following the one image data set, the control section allows the image forming section to form the image from the other image data set on an area posterior to the middle of the recording medium in the direction of conveyance of the recording medium by the conveyance section.

3. The image forming apparatus according to claim 1, further comprising a post-processing unit configured to subject a stack of the recording media having undergone the image formation of the image forming section to post-processing of stapling or punching,
wherein the post-processing unit subjects a leading end portion of the stack of the recording media in the direction of conveyance of the recording medium to the post-processing.

4. The image forming apparatus according to claim 1, further comprising an operating section operable to receive user's operation,
wherein each of operations of the document reading section, the document size detecting section, the image forming section, the recording medium size selecting section, the conveyance section, and the control section is performed when the operating section receives a command to execute double-sided printing for the mixed original documents of different document sizes.

5. An image forming method comprising:
a document reading step of reading one side of each of mixed original documents of different document sizes constituting a plurality of pages to generate respective image data sets of the original documents;
a document size detecting step of detecting respective sizes of the original documents to be read in the document reading step;
a recording medium size selecting step of, when, out of the image data sets of the original documents generated in the document reading step and constituting the plurality of pages, one of a pair of image data sets to be placed on one and the other sides of a common recording medium by image formation is greater in length of the document size detected in the document size detecting step than the other image data set, the length being a dimension in a direction of conveyance of the recording medium, selecting, as a size of the recording medium for use in forming images from the pair of image data sets, a size having a greater length in the direction of conveyance of the recording medium than the other image data set;
a conveyance step of conveying the recording medium of the size selected in the recording medium size selecting step; and
an image forming step of forming, on the recording media having sizes selected in the recording medium size selecting step and conveyed in the conveyance step, images from the image data sets of the original documents and, when the other of the pair of image data sets to be placed on one and the other sides of the common recording medium is to be formed as an image on a page preceding the one of the pair of image data sets, forming the image from the other image data set on an area from a leading edge to a middle of the recording medium in the direction of conveyance of the recording medium,
wherein, in the recording medium size selecting step, when the image data sets of the plurality of original documents constituting the plurality of pages are equal in a width of the document size in a direction perpendicular to the direction of conveyance of the recording medium and when, out of the image data sets of the plurality of original documents, one of the pair of image data set to be placed on one and the other side of the common recording medium has a greater document size than the other, the same size as the greater document size is selected as the size of the recording medium for use in forming images from the pair of image data sets, and
in the recording medium size selecting step, when the image data sets of the plurality of original documents constituting the plurality of pages are different in the width of the document size, a size of recording medium having the same width as the width making up the greatest majority of the different widths of the image data sets of the plurality of original documents is selected as the size of the recording medium for use in forming images from the image data sets of the plurality of original documents.

* * * * *